US010351289B2

(12) United States Patent
Langseder et al.

(10) Patent No.: US 10,351,289 B2
(45) Date of Patent: Jul. 16, 2019

(54) METHOD OF PRODUCING A SQUEEZE TUBE WITH MAXIMALLY LABELED SURFACE AREA

(75) Inventors: Neal E. Langseder, New Canaan, CT (US); Edward Wiegand, Philadelphia, PA (US)

(73) Assignee: CCL Label, Inc., Framingham, MA (US)

( * ) Notice: Subject to any disclaimer, the term of this patent is extended or adjusted under 35 U.S.C. 154(b) by 180 days.

(21) Appl. No.: 11/457,859

(22) Filed: Jul. 17, 2006

(65) Prior Publication Data

US 2007/0084557 A1 Apr. 19, 2007

Related U.S. Application Data

(63) Continuation-in-part of application No. 11/251,033, filed on Oct. 14, 2005.

(51) Int. Cl.
| | |
|---|---|
| *B65C 3/26* | (2006.01) |
| *B29D 23/20* | (2006.01) |
| *G09F 3/00* | (2006.01) |
| *B29C 65/00* | (2006.01) |
| *B29C 65/48* | (2006.01) |
| *B65C 7/00* | (2006.01) |
| B29C 65/08 | (2006.01) |
| B29C 65/10 | (2006.01) |
| B29C 65/16 | (2006.01) |
| B29C 65/18 | (2006.01) |
| B29C 65/36 | (2006.01) |
| B29K 23/00 | (2006.01) |
| B29K 27/06 | (2006.01) |
| B29L 9/00 | (2006.01) |
| B29L 23/20 | (2006.01) |
| B29L 31/00 | (2006.01) |
| B65C 9/00 | (2006.01) |

(52) U.S. Cl.
CPC ............... *B65C 3/26* (2013.01); *B29D 23/20* (2013.01); *B65C 7/00* (2013.01); *G09F 3/0295* (2013.01); *B29C 65/08* (2013.01); *B29C 65/10* (2013.01); *B29C 65/16* (2013.01); *B29C 65/18* (2013.01); *B29C 65/3604* (2013.01); *B29C 65/3656* (2013.01); *B29C 65/482* (2013.01); *B29C 65/4815* (2013.01); *B29C 66/02* (2013.01); *B29C 66/1122* (2013.01); *B29C 66/472* (2013.01); *B29K 2023/065* (2013.01); *B29K 2023/0633* (2013.01); *B29K 2023/086* (2013.01); *B29K 2023/12* (2013.01); *B29K 2027/06* (2013.01); *B29L 2009/00* (2013.01); *B29L 2023/20* (2013.01); *B29L 2031/744* (2013.01); *B65C 2009/0059* (2013.01); *Y10T 428/13* (2015.01)

(58) Field of Classification Search
CPC ......... B42D 15/00; C23F 1/00; H01L 21/306; B65D 71/00; B65D 85/00; B65D 1/40; B65D 3/22; B65D 6/14; B65D 8/04; B65D 90/02; B31C 1/00; B31C 3/00; B31C 5/00; B31C 11/04; B31C 1/04; B31C 3/04; B31B 1/90; B31D 1/02; B32B 9/04; B65C 3/26; B65C 7/00; G09F 3/0295; B29D 23/20; Y10T 428/13; B29C 66/472; B29C 65/482; B29C 65/4815; B29C 65/3604; B29C 65/16; B29C 65/10; B29C 66/1122; B29C 65/18; B29C 65/08; B29C 65/3656; B29C 2009/0059; B29C 66/02; B29K 2023/12; B29K 2023/086; B29K 2023/065; B29K 2027/06; B29K 2023/0633; B29L 2023/20; B29L 2009/00; B29L 2031/744
USPC ......... 40/124.01, 311, 584; 283/56, 61, 117, 283/81; 156/345; 206/232, 459.5; 220/62.22, 62.11; 493/269, 276, 308, 493/375; 428/411.1
See application file for complete search history.

(56) References Cited

U.S. PATENT DOCUMENTS

| | | | | |
|---|---|---|---|---|
| 1,432,400 | A | * 10/1922 | Levy | B65D 35/00 |
| | | | | 434/365 |
| 2,269,661 | A | 1/1942 | Gurwick | |
| 2,715,078 | A | 8/1955 | Cohen | |
| 2,715,087 | A | 8/1955 | Barradas | |
| 2,764,829 | A | * 10/1956 | Kingman | 40/306 |
| 2,808,926 | A | 10/1957 | Drake et al. | |
| 3,047,910 | A | 8/1962 | Downs et al. | 18/59 |
| 3,197,532 | A | 7/1965 | Maass et al. | 264/98 |
| 3,347,419 | A | 10/1967 | Brandt et al. | 222/107 |
| 3,508,944 | A | 4/1970 | Henderson et al. | |
| 3,690,996 | A | 9/1972 | Runzi | 156/542 |
| 3,959,066 | A | 5/1976 | Miller et al. | 156/459 |
| 4,006,275 | A | * 2/1977 | Monia | B65D 35/00 |
| | | | | 428/200 |
| 4,137,362 | A | 1/1979 | Miki et al. | |

(Continued)

FOREIGN PATENT DOCUMENTS

| | | |
|---|---|---|
| CH | 656851 | 7/1986 |
| DE | 3401959 | 7/1984 |

(Continued)

OTHER PUBLICATIONS

Supplemental Search Report from EPO Application 06816730, dated Nov. 30, 2011, EPO.
Office Action dated Nov. 10, 2011, from U.S. Appl. No. 11/251,033, filed Oct. 14, 2005.
Office Action dated May 17, 2011, from U.S. Appl. No. 11/251,033, filed Oct. 14, 2005.

(Continued)

*Primary Examiner* — Justin V Lewis

(74) *Attorney, Agent, or Firm* — McCarter & English, LLP

(57) ABSTRACT

The present invention relates to a method for producing a squeeze tube with maximal surface area labeling and a tube produced thereby.

12 Claims, No Drawings

(56) References Cited

U.S. PATENT DOCUMENTS

| | | | | |
|---|---|---|---|---|
| 4,237,362 | A | 12/1980 | Arnoldy | 219/76.14 |
| 4,310,369 | A | 1/1982 | Miller et al. | 156/218 |
| 4,351,692 | A * | 9/1982 | Ouellette | B29C 57/10 |
| | | | | 156/153 |
| 4,511,426 | A | 4/1985 | Linnér | |
| 4,540,542 | A | 9/1985 | Weiler | 264/524 |
| 4,665,127 | A | 5/1987 | Hirose et al. | 525/100 |
| 4,972,765 | A | 11/1990 | Dixon | 454/164 |
| 5,069,856 | A | 12/1991 | Holoubek et al. | 264/519 |
| 5,088,643 | A | 2/1992 | Frazier et al. | |
| 5,141,136 | A | 8/1992 | Tignor | 222/212 |
| 5,213,235 | A | 5/1993 | Miranda et al. | 222/107 |
| 5,366,251 | A * | 11/1994 | Brandt | B44C 1/1712 |
| | | | | 283/81 |
| 5,577,907 | A | 11/1996 | Linner | |
| 5,632,951 | A | 5/1997 | Smith et al. | 264/509 |
| 5,654,054 | A | 8/1997 | Tropsha et al. | |
| 5,908,124 | A | 6/1999 | Klauke et al. | 215/48 |
| 5,944,357 | A * | 8/1999 | Instance | B31D 1/021 |
| | | | | 156/250 |
| 6,089,404 | A | 7/2000 | Mecks | 222/92 |
| 6,127,032 | A * | 10/2000 | Kelch | B32B 17/10 |
| | | | | 428/335 |
| 6,210,766 | B1 * | 4/2001 | McLaughlin | 428/35.7 |
| 6,250,316 | B1 | 6/2001 | Brandt et al. | |
| 6,588,178 | B1 | 7/2003 | Kieras | 53/415 |
| 6,752,431 | B1 * | 6/2004 | Matthews et al. | 283/81 |
| 2003/0017293 | A1 * | 1/2003 | Franko et al. | 283/81 |
| 2003/0067099 | A1 * | 4/2003 | Miller et al. | 264/447 |
| 2003/0085564 | A1 * | 5/2003 | Franko, Sr. | 283/81 |
| 2003/0211224 | A1 | 11/2003 | Eichelberger et al. | |
| 2004/0017075 | A1 * | 1/2004 | Knoerzer | B41M 3/00 |
| | | | | 283/72 |
| 2004/0053013 | A1 | 3/2004 | Kyono et al. | 428/195.1 |
| 2005/0184505 | A1 * | 8/2005 | Barlow | 283/81 |

FOREIGN PATENT DOCUMENTS

| | | |
|---|---|---|
| DE | 3744402 | 7/1989 |
| DE | 4114156 | 11/1992 |
| DE | 19750263 | 5/1999 |
| DE | 29905766 | 6/1999 |
| DE | 19822068 | 11/1999 |
| DE | 10333160 | 2/2005 |
| DE | 102004059138 | 6/2006 |
| EP | 0667285 | 8/1995 |
| EP | 0873942 | 10/1998 |
| EP | 0939033 | 9/1999 |
| EP | 1095855 | 5/2001 |
| FR | 2 741 043 | 9/1995 |
| JP | 59 2816 | 1/1984 |
| JP | 56 62871 | 5/1991 |
| JP | 6 198703 | 7/1994 |
| JP | 6 211256 | 8/1994 |
| JP | H0826204 | 1/1996 |
| JP | 2001-254063 | 9/2001 |
| JP | 2002361776 A | 12/2002 |
| WO | WO 98/55297 | 12/1998 |
| WO | WO 99/02330 | 1/1999 |
| WO | WO 00/58074 | 10/2000 |
| WO | WO 2005/085081 A1 | 9/2005 |

OTHER PUBLICATIONS

Office Action dated Aug. 5, 2010, from U.S. Appl. No. 11/251,033, filed Oct. 14, 2005.
PCT International Preliminary Report on Patentability, from application PCT/US06/39747 dated Jun. 26, 2008, filed Oct. 11, 2006.
PCT Written Opinion of the International Searching Authority dated May 3, 2007, from application PCT/US06/39747, filed Oct. 11, 2006.
"Fasson Tube Labeling Product Guide," Fasson, Copyright 2004.
Office Action dated Sep. 6, 2013; from U.S. Appl. No. 11/251,033.
Interview Summary dated Feb. 9, 2012, from U.S. Appl. No. 11/251,033.
Machine Translation for JP 06211256 2007, translated Oct. 26, 2007.
JPO abstract for JP 59002816, publication published 1984.
Derwent abstract for JP 59002816, publication published 1984.
Declaration of Meade Rudasill, submitted in U.S. Appl. No. 11/251,033, dated Aug. 28, 2009.
Declaration of Gus Davis, submitted in U.S. Appl. No. 11/251,033, dated Aug. 17, 2009.
Declaration of Ed Wiegand, submitted in U.S. Appl. No. 11/251,033, dated Sep. 3, 2009.
Gerhard Gierenz, et al., "Mechanism of Pressure-Sensitive Adhesion," from Adhesives and Adhesive Tapes, p. 99 (published 2001) (3 pages).
Canadian Office Action dated Aug. 26, 2010 from application 2,625,882 (2 pages).
Mexican Office Action dated Feb. 3, 2011 regarding application MX/a/2008/004931 (2 pages).
Mexican Office Action dated Mar. 17, 2011 regarding application MX/a/2008/004931 (3 pages).
Mexican Office Action dated Oct. 11, 2011 regarding application MX/a/2008/004931 (3 pages).
Mexican Office Action dated Apr. 10, 2012 regarding application MX/a/2008/004931 (3 pages).
Notice of Allowance issued by the Mexican Institute of Industrial Property dated Oct. 2, 2012 regarding application MX/a/2008/004931 (1 page).
Translation of previously cited FR2741043 published on May 16, 1997 (10 pages).
Opposition and Grounds (with English translation) filed May 13, 2014 in the European Patent Office in connection with co-owned European Patent No. 1949351 (20 pages).
Opposition and Grounds filed Oct. 15, 2014 in the European Patent Office in connection with co-owned European Patent No. 1949351 (17 pages).
Office Action dated Dec. 16, 2014, issued in connection with pending U.S. Appl. No. 11/251,033 (21 pages).
Office Action dated May 14, 2014, issued in connection with pending U.S. Appl. No. 11/251,033 (20 pages).
Office Action dated Nov. 10, 2011, issued in connection with pending U.S. Appl. No. 11/251,033 (13 pages).
Office Action dated May 17, 2011, issued in connection with pending U.S. Appl. No. 11/251,033 (13 pages).
Office Action dated Aug. 5, 2010, issued in connection with pending U.S. Appl. No. 11/251,033 (14 pages).
Office Communication dated Oct. 31, 2007 from U.S. Appl. No. 11/251,033, filed Oct. 14, 2005.
Office Communication dated Mar. 3, 2008 from U.S. Appl. No. 11/251,033, filed Oct. 14, 2005.
Office Communication dated May 16, 2008 from U.S. Appl. No. 11/251,033, filed Oct. 14, 2005.
Office Communication dated Aug. 27, 2008 from U.S. Appl. No. 11/251,033, filed Oct. 14, 2005.
Office Communication dated Nov. 7, 2008 from U.S. Appl. No. 11/251,033, filed Oct. 14, 2005.
Office Communication dated May 8, 2009 from U.S. Appl. No. 11/251,033, filed Oct. 14, 2005.
Office Communication dated Oct. 26, 2009 from U.S. Appl. No. 11/251,033, filed Oct. 14, 2005.
Office Communication dated Nov. 5, 2009 from Canadian Patent Application No. 2,625,882 filed Oct. 11, 2006.
Office Communication dated Nov. 10, 2009 from U.S. Appl. No. 11/251,033, filed Oct. 14, 2005.
Office Communication dated Dec. 17, 2009 from U.S. Appl. No. 11/251,033, filed Oct. 14, 2005.
FINAT Test Method No. 15, "Surface Tension of Corona Treated Plastic Films," FINAT Technical Handbook, 7th Edition, 2005, pp. 38-40.
Beauty Packaging Magazine, "Mergers and Acquisitions Change Tube Industry," featured article in the Nov./Dec. 2003 issue, pp. 4-8.
Beauty Packaging Magazine, "Label Technology," featured article in the Jan./Feb. 2004 issue, pp. 1-4.

(56) References Cited

OTHER PUBLICATIONS

NORDENMATIC 700 "Automatic tube filling and sealing machine," brochure, Norden Company (7 pages).
James F. Carley and P. Thomas Kitze, "Corona-Discharge Treatment of Polymeric Films, II: Chemical Studies," Polymer Engineering and Science, vol. 20, No. 5, Mar. 1980, pp. 330-338.
Edward M. Liston, "Plasma Treatment for Improved Bonding: A Review," The Journal of Adhesion, vol. 30, Apr. 1989, pp. 199-218.
A. Kruse et al., "Surface Pretreatment of Plastics for Adhesive Bonding," Journal of Adhesion Science and Technology, vol. 9, No. 12, Aug. 1995, pp. 1611-1621.
Christine (Qin) Sun et al., "Corona Treatment of Polyolefin Films—A Review," Advances in Polymer Technology, vol. 18, No. 2, Jan. 1999, pp. 171-180.
FASSON product datasheets (4 pages).
"Tubes of the Year" 2004 Winners, The Tube Council (5 pages).
Tubed Products—Labeling Tech. Bulletin, Apr. 2005 (8 pages).
Dordan Manufacturing Co., "How Package Design Dictates Product Sales: Seeing It Sells It!" Consumer Research Report (2010) (9 pages).
Declaration of Ulrich E. Weyermann dated Apr. 5, 2012, submitted in connection with U.S. Appl. No. 11/251,033 (3 pages).
Declaration of Ulrich E. Weyermann dated Apr. 14, 2017, submitted in connection with U.S. Appl. No. 11/251,033 (4 pages).
Declaration of Ulrich E. Weyermann dated Mar. 16, 2018, submitted in connection with U.S. Appl. No. 11/251,033 (6 pages).
Declaration of Ed Wiegand dated Oct. 28, 2009, submitted in connection with U.S. Appl. No. 11/251,033 (10 pages).
Declaration of Ed Wiegand dated Nov. 4, 2009, submitted in connection with U.S. Appl. No. 11/251,033 (2 pages).
Interview Summary dated Oct. 22, 2014, issued in connection with U.S. Appl. No. 11/251,033 (3 pages).
Office Action dated Jul. 28, 2015, issued in connection with U.S. Appl. No. 11/251,033 (28 pages).
Office Action dated Mar. 9, 2016, issued in connection with U.S. Appl. No. 11/251,033 (22 pages).
Office Action dated Oct. 14, 2016, issued in connection with U.S. Appl. No. 11/251,033 (27 pages).
Advisory Action dated May 5, 2017, issued in connection with U.S. Appl. No. 11/251,033 (3 pages).
Office Action dated Nov. 15, 2017, issued in connection with U.S. Appl. No. 11/251,033 (22 pages).
Office Action dated May 16, 2018, issued in connection with U.S. Appl. No. 11/251,033 (21 pages).
Office Action dated Nov. 13, 2018, issued in connection with U.S. Appl. No. 11/251,033 (26 pages).
Patent Owner Reply to Notices of Opposition, dated Jun. 19, 2015, filed in connection with Opposition proceedings in co-owned European Patent No. 1949351 (7 pages).
Letter of Opposition dated Oct. 23, 2015, filed in connection with co-owned European Patent No. 1949351 (15 pages, with machine-generated English translation).
Summons to Oral Proceedings, dated Dec. 3, 2015, issued in connection with Opposition proceedings in co-owned European Patent No. 1949351 (5 pages).
Patent Owner Reply dated Apr. 28, 2016, filed in connection with Opposition proceedings in co-owned European Patent No. 1949351 (43 pages).
Decision Rejecting the Opposition, dated Jul. 11, 2016, issued by the European Patent Office in connection with co-owned European Patent No. 1949351 (22 pages).
Statement of Grounds of Appeal dated Oct. 26, 2016, filed in connection with Opposition to co-owned European Patent No. 1949351 (27 pages, with machine-generated English translation).
Patent Owner Reply to Notice of Appeal, dated Mar. 10, 2017, filed in connection with co-owned European Patent No. 1949351 (52 pages).
Letter of Appeal dated Nov. 14, 2017, filed in connection with Opposition to co-owned European Patent No. 1949351 (25 pages).
Patent Owner Reply dated Jun. 19, 2018, filed in connection with Appeal proceedings in co-owned European Patent No. 1949351 (10 pages).

\* cited by examiner

METHOD OF PRODUCING A SQUEEZE TUBE WITH MAXIMALLY LABELED SURFACE AREA

INTRODUCTION

This application is a continuation-in-part of U.S. Ser. No. 11/251,033 filed Oct. 14, 2005.

BACKGROUND OF THE INVENTION

Various products such as personal care or cosmetic products (e.g., toothpaste and lotions) are sold to consumers in flexible plastic tubes. Squeezable tube-shaped containers have a tubular body with one end heat-sealed along a straight line seam. For instance, see U.S. Pat. Nos. 5,632,951; 3,197,532; 5,908,124; and 5,213,235, which disclose the use of blow molding techniques for forming tube-shaped containers. In addition, U.S. Pat. No. 5,908,124 discloses the formation of an integral twist-off closure to eliminate the need for providing a separately manufactured closure. Also see U.S. Pat. No. 4,540,542 which discloses a method of making an extrusion blow molded container with an integral, removable closure and U.S. Pat. No. 5,141,136 which discloses a squeeze bottle having dual openings. The formation of tubular containers from a longitudinally stretched, extruded, thermoplastic cylinder is described in U.S. Pat. No. 3,047,910 and U.S. Pat. No. 5,069,856. Side-seam tubes are also generally disclosed in U.S. Pat. Nos. 3,959,066 and 4,310,369.

Generally, the squeeze tube is formed by cross-sealing the tubular body with a cross-sealing apparatus. There are various techniques for sealing including hot jaw sealing, wherein the tube is pressed between a pair of heated sealing jaws; sonic welding; induction sealing where a magnetic field is used to excite foil within the tube wall structure to melt the plastic before pressing together; hot air sealing, wherein heated air is used to melt the plastic before pressing; and laser sealing where a laser is used to heat the plastic before pressing. In most cases, the tube is not labeled or decorated in the seal area because damage to the label, ink, or surface coating can occur during sealing. The label or coating can discolor due to the heat, or the label coating or ink may lose adhesion to the tube and separate due to the heat. In addition the application of label material, coating or ink on the surface of the tube in the seal area may affect the seal integrity or contaminate the inside of the seal area and prevent sealing. For these reasons the tube label and decoration generally does not cover the entire surface area of the tube.

While Norden AndBro Inc. teach a medium density polyethylene tube with a full wrap label from Impres Label, which extends through the tube's sealed end, the label on this tube delaminates in the sealed area and is not esthetically pleasing when displayed on store shelves. As such, label manufacturers, such as FASSON Role North America (Painesville, Ohio), generally recommend that a label's edge be positioned on a tube at least ¼ inch from the start of the crimp to avoid subsequent label darting or flagging.

SUMMARY OF THE INVENTION

The present invention relates to methods for producing a squeeze tube with maximal surface area labeling. In one embodiment, a label is adhered to a preformed tube and the label and preformed tube are sealed through so that a squeeze tube is formed, wherein the label encompasses at least a portion of the sealed area of the squeeze tube.

In another embodiment, a label is adhered to a tube film, a tube is generated, and the label and tube are sealed through so that a squeeze tube is formed, wherein the label encompasses at least a portion of the sealed area of the squeeze tube.

Squeeze tubes produced by the instant methods are also provided.

DETAILED DESCRIPTION OF THE INVENTION

It has now been found that the labeled surface area of a squeeze tube can be maximized by extending the label into the sealed area of the squeeze tube. Advantageously, a label adhered to a tube or tube film in accordance with the disclosed method does not dart or flag and does not delaminate from the tube. As used in the context of the instant invention, a squeeze tube is a flexible, cylindrical package generally made from plastic (e.g., low to high density polyethylene, polypropylene, polyvinyl chloride, and soft-ouch, dual layer, and coextruded plastics) or laminate film (ethylene vinyl alcohol resin). Squeeze tubes are formed by blow-molding or extruding material into a tube structure or alternatively rolling and adhering tube film (e.g., monolayer, coextruded or laminate film or sheet stock) into a side-seam tube structure. The tube thus formed is then filled through the open end with a machine designed for filling tubes. Subsequently, the filled tube is sealed at one end resulting in a package with a cylindrical, open end and a flattened, closed end. Accordingly, as one of skill in the art can appreciate, a label of the present invention can be applied to either a preformed tube (e.g., blow-molded or extruded), or alternatively applied to a tube film prior to generating the tube structure and end sealing.

For the purposes of the instant invention, a tube or tube film used in the manufacture of a tube can be coated or uncoated prior to label adhesion. Coated tube or tube film is intended to mean a material used in the manufacture of a squeeze tube in which a surface coating has been applied. Such surface coatings include any solvent-based, water-based or radiation-curable coating material designed to provide abrasion resistance, barrier properties and optionally enhanced gloss or matte finish. Such surface coatings include epoxies, urethanes, polyesters, acrylics, and the like. Conversely, uncoated tube or tube film is intended to mean a tube material which lacks a surface coating. Unexpectedly, it has been found that the label, when applied through the sealed area of the tube, achieves a comparable level of barrier properties as a coating. Because coating the tube or tube film could inhibit subsequent treatment to achieve a sufficient dyne level, particular embodiments embrace a tube or tube film lacking a surface coating.

The methods of the instant invention can be carried out with a variety of tube materials in combination with a variety of label adhesives. As such, solvent-type adhesives, emulsion-type adhesives or hot-melt type adhesives are suitable so long as the adhesive selected can withstand the heat and pressure of end sealing. Such adhesives include, for example, rubbery adhesive agents, vinyl acetate adhesive agents, ethylene-vinyl acetate adhesive agents, polyvinyl alcohol adhesive agents, polyvinyl acetal adhesive agents, vinyl chloride adhesive agents, acrylic adhesive agents, polyamide adhesive agents, polyethylene adhesive agents, cellulose adhesive agents, polysulfide adhesive agents and hot-melt type high-polymer-containing adhesives. Other methods which promote label adhesion, e.g., a super adhesive, a coating, or other treatment that increases surface energy can also be employed.

The term label is used herein in a broad sense to refer to a substrate that has been printed and subsequently attached to a surface so as to decorate the object or identify its contents. Labels, as used herein, can be supplied in various forms. Such labels can be individually cut and applied, can be cut, carried on and applied from a web of liner material, or can be unsupported, printed film or sheet roll stock that is subsequently laminated to tubes or tube film. Labels of the instant invention are affixed to the surface of a tube or tube film (i.e., the labels are not initially a component of the tube material itself) to provide product identifiers, product source/manufacturer identifiers, bar codes, nutritional information, decoration, and the like. Labels can be made of single or multiple layers and panels of any suitable paper or plastic material commonly employed in the labeling of consumer products. Advantageously, a label of the instant squeeze tube covers at least a portion, e.g., 20%, 40%, 50%, 60%, 80%, or 100% of the flattened, closed end of the squeeze tube, also referred to herein as the sealed area of the squeeze tube. As such, more surface area of the consumer package is available for providing product information or decoration.

To facilitate adhesion, particular embodiments of the present invention embrace pretreating the unlabeled tube material under conditions which achieve a dyne level of at least 34. In other embodiments, a dyne level of 38 to 48, or more is achieved. Such conditions include treating the tube material with flame, plasma, or corona to enhance label adhesion. For example, corona treating involves discharging up to about 10,000 volts of electricity from a ceramic electrode to a ground roll over which the tube material is passing. This high voltage field called corona alters the surface of the film, raising the surface energy of the film so that label adhesion is enhanced. While a dyne level of at least 34 is desirable, it is contemplated that some tube materials could be used at a dyne level of 30 or 32. Surface tension or dyne level can be tested using any standard methods, e.g., dyne solutions or ACCU DYNE TEST™ marker pens.

Because the label of the instant squeeze tube encompasses at least a portion of the seal area of the squeeze tube, particular embodiments of the instant invention embrace the use of a tube filling and sealing machine which seals through the label and tube by heating the internal surface of the tube so that the label is exposed to minimal heat during sealing. Suitable sealing techniques which heat the internal tube sealing surface before applying sealing pressure include hot air sealing, sonic welding, laser, and induction. Machines of this type are routinely used in the art of squeeze tube, bag and pouch manufacturing.

A label affixed to a squeeze tube in accordance with the instant method generally has label peel strength adhesion values in the range of 1000 to 2500 grams/inch at 12 inches/minute pull speed. Optionally, label peel strength adhesion values in the range of 600 to 1200 grams/inch or 800 to 1500 grams/inch are also satisfactory under particular conditions. As such, particular embodiments embrace a label which does not subsequently delaminate in the sealed area of the labeled tube.

Moreover, the label as affixed herein can be designed to withstand testing that would simulate normal use of the squeeze tube including, but not limited to, the moisture resistance testing, filled and unfilled; oven temperature storage at 45° C., filled and unfilled; product resistance; water submersion; soapy water testing; eight weeks-long term storage at 45° C.; and flexing.

The instant method finds application in the manufacture of squeeze tubes for a variety of consumable or purchased goods or products including personal care products (e.g., soaps, shampoos, make-up, insect repellents, and the like); first aid products (e.g., ointments, sunscreens, and the like); cleaners (e.g., detergents and cleaning solutions); paints; and foodstuffs (e.g., yogurt, cheese-like products, jelly, and the like). The instant method is a significant improvement in the manufacture of squeeze tubes because the product label can encompass nearly all of the available surface area of the squeeze tube thereby enhancing the package appearance.

What is claimed is:

1. A method for producing a squeeze tube with maximal surface area labeling comprising:
   (a) pretreating a preformed tube with flame, plasma, or corona to obtain a dyne level of at least 38;
   (b) adhering a label to the preformed tube with a solvent, emulsion, or hot-melt adhesive, wherein substantially all of a label surface is adhered to and covers the surface of the preformed tube as well as extending into and including at least a portion of a seal, with a peel strength adhesive value between the label and the preformed tube in the range of 800 to 2500 grams/inch at 12 inches/minute pull speed, and wherein the label is not a component of the preformed tube material; and
   (c) sealing through one end of the preformed tube and label adhered to said preformed tube at the seal by heating only an internal surface of the tube before applying sealing pressure so that a squeeze tube is sealed, wherein the label encompasses at least a portion of the seal of the squeeze tube thereby producing a squeeze tube with maximal surface area labeling.

2. A squeeze tube produced by the method of claim 1.

3. The method of claim 1 wherein the label covers the tube from near a proximal end to a distal end including within the seal.

4. The method of claim 1, wherein the adhesive value between the label and the preformed tube in the range of 800 to 2500 grams/inch at 12 inches/minute pull speed provides for the label to withstand moisture resistance testing, oven temperature storage at 45 degrees Celsius, product resistance, water submersion, soapy water testing, eight weeks-long term storage at 45 degrees Celsius, and flexing for filled and unfilled tubes.

5. The method of claim 1, wherein the label is coated with a solvent-based, water-based, or radiation-curable coating to provide abrasion resistance.

6. The method of claim 1, wherein the label is individually cut and applied.

7. The method of claim 1, wherein the label is carried on and applied from a web liner material.

8. A method for producing a squeeze tube with maximal surface area labeling comprising:
   (a) adhering a label to a tube film with a solvent, emulsion, or hot-melt adhesive, wherein substantially all of a label surface is adhered to and covers the surface of the tube film, and wherein the label is not a component of the tube film material;
   (b) subsequently generating a tube from the labeled tube film;
   (c) sealing through one end of the tube and label adhered to said tube at the seal by heating only an internal surface of the tube before applying sealing pressure so that a squeeze tube is sealed, wherein the label encompasses at least a portion of the seal of the squeeze tube thereby producing a squeeze tube with maximal surface area labeling.

9. A squeeze tube produced by the method of claim 8.

10. The method of claim 8 wherein the label covers the tube from near a proximal end to a distal end including within the seal.

11. The method of claim 8, wherein the label is coated with a solvent-based, water-based, or radiation-curable coating to provide abrasion resistance.

12. The method of claim 8, wherein the label is unsupported printed film subsequently laminated to the tube.

* * * * *

UNITED STATES PATENT AND TRADEMARK OFFICE
CERTIFICATE OF CORRECTION

PATENT NO. : 10,351,289 B2
APPLICATION NO. : 11/457859
DATED : July 16, 2019
INVENTOR(S) : Neal E. Langseder and Edward Wiegand It is certified that error appears in the above-identified patent and that said Letters Patent is hereby corrected as shown below:

On the Title Page

In Column 2, item (56) References Cited, Other Publications, the date of "Supplemental Search Report from EPO Application 06816730" should be corrected from "Nov. 30, 2011" to --Dec. 7, 2011--

On Page 2, Column 1, item (56) References Cited, Foreign Patent Documents, the date of "JP 56 62871" should be corrected from "5/1991" to --5/1981--

In the Specification

In Column 1, Lines 44-45, "label coating or ink" should be corrected to --label, coating or ink--

In Column 1, Line 52, "Norden AndBro Inc." should be corrected to --Norden And Bro Inc.--

In Column 2, Lines 22-23, "soft-ouch" should be corrected to --soft-touch--

In the Claims

In Column 4, Line 40, "the adhesive value" should be corrected to --the peel strength adhesive value--

In Column 4, Line 65, "the seal" should be corrected to --a seal--

Signed and Sealed this
Twenty-second Day of October, 2019

Andrei Iancu
*Director of the United States Patent and Trademark Office*